US005454477A

United States Patent [19]
Bornhorst et al.

[11] Patent Number: 5,454,477
[45] Date of Patent: Oct. 3, 1995

[54] STORAGE AND TRANSPORATATION TRUNK FOR LIGHTING EQUIPMENT

[75] Inventors: James M. Bornhorst, DeSoto; Edwin B. Dangerfield, Arlington; James Maddux III, Carrollton; Timothy D. Stacy, Plano; Timothy W. Terleski, Garland, all of Tex.

[73] Assignee: Vari-Lite, Inc., Dallas, Tex.

[21] Appl. No.: 940,663

[22] Filed: Sep. 4, 1992

[51] Int. Cl.⁶ .................................................. B65D 81/00
[52] U.S. Cl. ........................ 220/23.4; 220/466; 220/606; 220/632
[58] Field of Search .................................. 220/23.4, 466, 220/606, 632

[56] References Cited

U.S. PATENT DOCUMENTS

| | | | |
|---|---|---|---|
| 2,031,855 | 2/1936 | Rollason | 220/466 |
| 2,099,113 | 11/1937 | Hollnagel | 220/466 |
| 2,182,116 | 12/1939 | Copeman | 220/466 |
| 2,503,339 | 4/1950 | Jandus | 220/466 |
| 3,268,199 | 8/1966 | Kordyban et al. | 220/632 |
| 3,349,940 | 10/1967 | Cornelius | 220/466 |
| 4,287,997 | 9/1981 | Rolfe et al. | 220/23.4 |
| 4,351,541 | 9/1982 | Propst et al. | 220/23.4 |
| 4,793,491 | 12/1988 | Wolf et al. | 220/466 |
| 4,925,048 | 5/1990 | Noack | 220/606 |

*Primary Examiner*—Joseph Man-Fu Moy
*Attorney, Agent, or Firm*—Morgan & Finnegan

[57] ABSTRACT

A storage trunk for storing and transporting lighting equipment is constructed using a rotationally molded cross linked polyethylene plastic. The storage trunk is comprised of an enclosure body and a separately removable lid. The lid may be secured to the enclosure body by means of a plurality of latches. The interior of the enclosure body may be molded as a generally open rectangular region or may include molded features for receiving and supporting specific lighting instruments within its interior. The hollow walls of the molded enclosure body are filled with polyurethane foam for reinforcing the walls and damping their movement. A perforated metal stiffening frame is molded into the base of the enclosure body during the molding process for added strength. The underside of the enclosure body provides a plurality of casters for easy movement. The storage trunk features a unitized, seamless construction having no fasteners or external reinforcements to leak, snag other objects, or fall off. Various molded recesses, protrusions and surfaces in the storage trunk serve to enhance the functionality, strength and durability of the plastic storage trunk. Lateral bearing surfaces that protrude from the storage trunk minimize the wear on the exterior surfaces of the trunk by ensuring that the entire surface of the trunk does not contact adjacent surfaces. The storage trunk is constructed with convoluted end surfaces having protrusions and recesses that allow adjacent surfaces to interlock when positioned end to end.

17 Claims, 13 Drawing Sheets

STORAGE AND TRANSPORATATION TRUNK FOR LIGHTING EQUIPMENT

TECHNICAL FIELD OF THE INVENTION

The present invention relates to portable storage trunks and in particular to storage trunks that are suitable for transporting lighting equipment and the like.

BACKGROUND AND DISCUSSION OF PRIOR ART

Entertainment lighting equipment must often be transported from one performance venue to another during the course of a concert tour. The lighting equipment must be carefully packed in protective containers to survive the rigors of transporting the equipment from city to city.

One known technique for protecting the equipment during transport is the utilization of wooden boxes having their interiors lined with cushioning material and having handles and casters on the exterior of the container to facilitate handling. Once the equipment is packed inside a container, the container may be rolled on its casters and loaded into a truck for transport. Typically, the containers will be stacked one on top of the other, side by side, and from front to back in the truck to load as many containers as possible into each truck.

A significant practical consideration which influences the design and construction of such transport containers is the constraint that the containers must be loaded and stacked by no more than four people and must be able to be routinely handled by a single person. Additionally, the characteristics of the equipment to be housed within the container must be considered. In the case of automated luminaires, the size, shape, and weight of each lamp unit will determine the maximum number of lamp units that can be housed in a single case while still meeting the handling restrictions described above.

Storage containers are typically loaded onto a truck by rolling the containers into the truck, e.g., by utilizing a ramp or lift platform, standing the cases on end with the lid facing the front of the truck and the casters facing the door at the rear of the truck, and then lining the cases up side-by-side in a row across the width of the truck. When the container height permits, a second level of cases is stacked across the top of the first row. Thereafter, additional rows of cases may be stacked across the width of the truck behind the first row, with the lids of these containers adjacent to the casters of the first row of containers.

One known protective transport container is constructed of plastic-coated plywood panels having aluminum extrusion edge protectors and steel corner protectors riveted to the plywood panels. The major surfaces of such containers, however, are susceptible to abrasive damage resulting from the containers rubbing against each other and other objects during transportation. Additionally, the plywood panels are susceptible to water damage if rained on at an outdoor concert. As a result, over time the plywood panels will tend to warp and delaminate.

Although these containers provide a certain degree of impact resistance, they allow shocks to be transmitted to the equipment housed inside. Furthermore, the metal edge and comer protectors and the fastening rivets protrude from the otherwise smooth surface of the plywood side panels and tend to snag other objects. Additionally, the potential for these containers to damage other containers or equipment, or to injure stage hands who may be handling the containers is significant.

The riveted construction of such containers provides a potential failure point at each rivet, as leakage sites in the plywood side panels. In addition, the edge and comer protectors can separate from the cases and require replacement.

Other protective containers are constructed of plywood panels covered with indoor/outdoor carpet. While carpet-covered cases provide smooth exterior surfaces with no protrusions, the carpet does not weather well. Wet carpet becomes heavy, adding significant weight to the case. Additionally, wet carpet causes the plywood panels to rot and warp and tends to produce a foul odor.

Plywood cases are basically large, planar surfaces joined at right angles to form a rectangular enclosure. Due to the nature of plywood construction, other shapes are difficult to build. Construction of plywood cases is complex, requiring many pans to achieve the desired strength and stiffness. A considerable drawback of such cases is that they are relatively heavy compared to the equipment contained therein, and may comprise a significant part of the freight load of the truck transporting the equipment. Additionally, the construction of such cases is costly and labor-intensive. Interior details are limited by the plywood construction methods. While foam packing inserts may be utilized for cushioning the equipment inside the containers, the foam inserts tend to deteriorate over time, get dirty, and require replacement.

Aluminum cases are relatively expensive and have thin walls offering only minimal protection against impact damage. The aluminum extrusions that are typically used to reinforce the edges can be easily bent if stepped on while the container is open, and are difficult to repair. Containers having bent edge protectors are usually difficult to close and are nearly impossible to seal.

Accordingly, it is an object of the present invention to provide a protective road case container for lighting equipment and other concert production equipment which is free of the above described drawbacks and provides advantages which include durability, strength, improved stackability, shock absorbance, impact resistance and abrasion resistance.

It is a further object of the invention to provide a protective road case container that is waterproof, light-weight, inexpensive, easy to manufacture and safer and more efficiently handled than prior art designs.

Yet another object of the invention is to provide a protective road case container which exploits the considerable advantages of a container constructed using a rotationally molded plastic process.

SUMMARY OF THE INVENTION

Generally, one aspect of the invention comprises a trunk for containing lighting equipment, wherein the trunk comprises: a plastic enclosure body having an interior volume for containing lighting equipment and formed by a base molded to a plurality of walls in a seamless design; a reinforcing frame molded into the base; a removable plastic lid; fastening means to secure the enclosure body to the lid; and a mounting plate molded into the enclosure body and lid, wherein the mounting plate has a mounting surface extending from the enclosure body and the lid for mounting the fastening means.

Another aspect of the invention comprises a trunk for containing lighting equipment, wherein the trunk comprises: a plastic enclosure body having an interior volume for containing the lighting equipment, the body formed by a base molded to a plurality of walls in a seamless design, wherein each of the walls is comprised of an inner wall and an outer wall with a hollow region therebetween; a reinforcing frame molded into the base; a removable plastic lid; and fastening means to secure the enclosure body to the lid, the fastening means affixed to the outer wall by mounting means, the mounting means terminating in the hollow region.

According to other features of the invention:

1. The reinforcing frame and/or mounting plate may include perforations, wherein melted plastic may flow through the perforations.

2. The walls may be hollow and filled with polyurethane foam.

3. The interior volume may be molded to form a generally rectangular open volume or be molded to conform to the exterior characteristics of the lighting devices to be stored.

4. The plastic enclosure body and/or plastic lid may be formed by a rotationally molded plastic process.

5. The lid may further include recesses for receiving the casters of a second trunk stacked on the first trunk and these recesses may be reinforced with additional plastic material.

6. At least one of the walls may further include protrusions and recesses on the exterior of the wall for interlocking with an adjacent trunk of similar construction.

7. The reinforcing frame may further include a steel plate at each corner, wherein the steel plate has a mounting surface extending through the underside of the enclosure body for mounting casters.

8. The lid may further include a clearance channel for receiving the upper portions of the contained lighting equipment.

BRIEF DESCRIPTION OF DRAWINGS

A more complete understanding of the present invention may be had by reference to the following Detailed Description with the accompanying drawings, wherein.

DETAILED DESCRIPTION OF PREFERRED EMBODIMENTS

Figure 1:
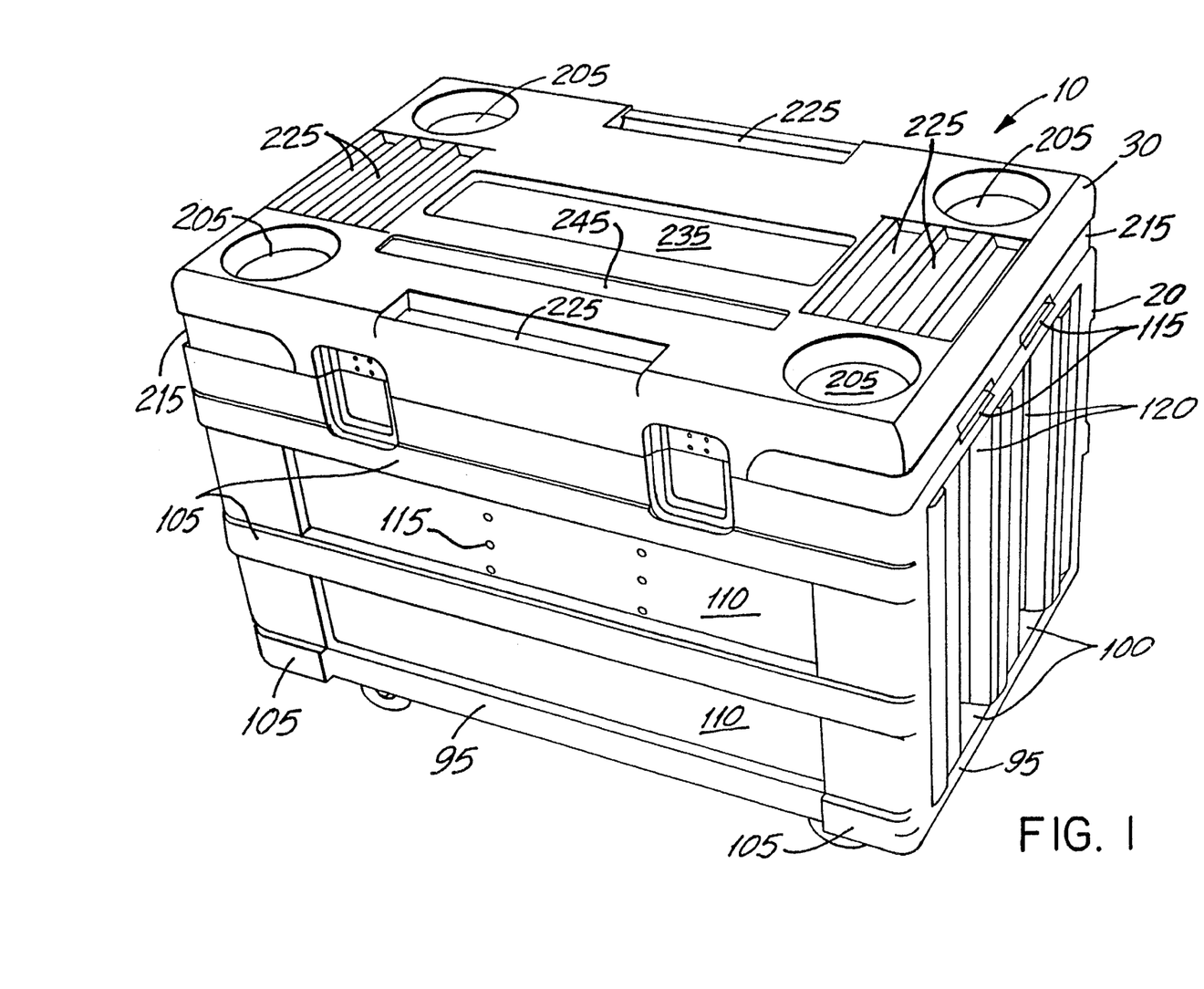
FIG. 1 is a top and right side perspective view of a storage trunk according to the present invention.
Figure 2:
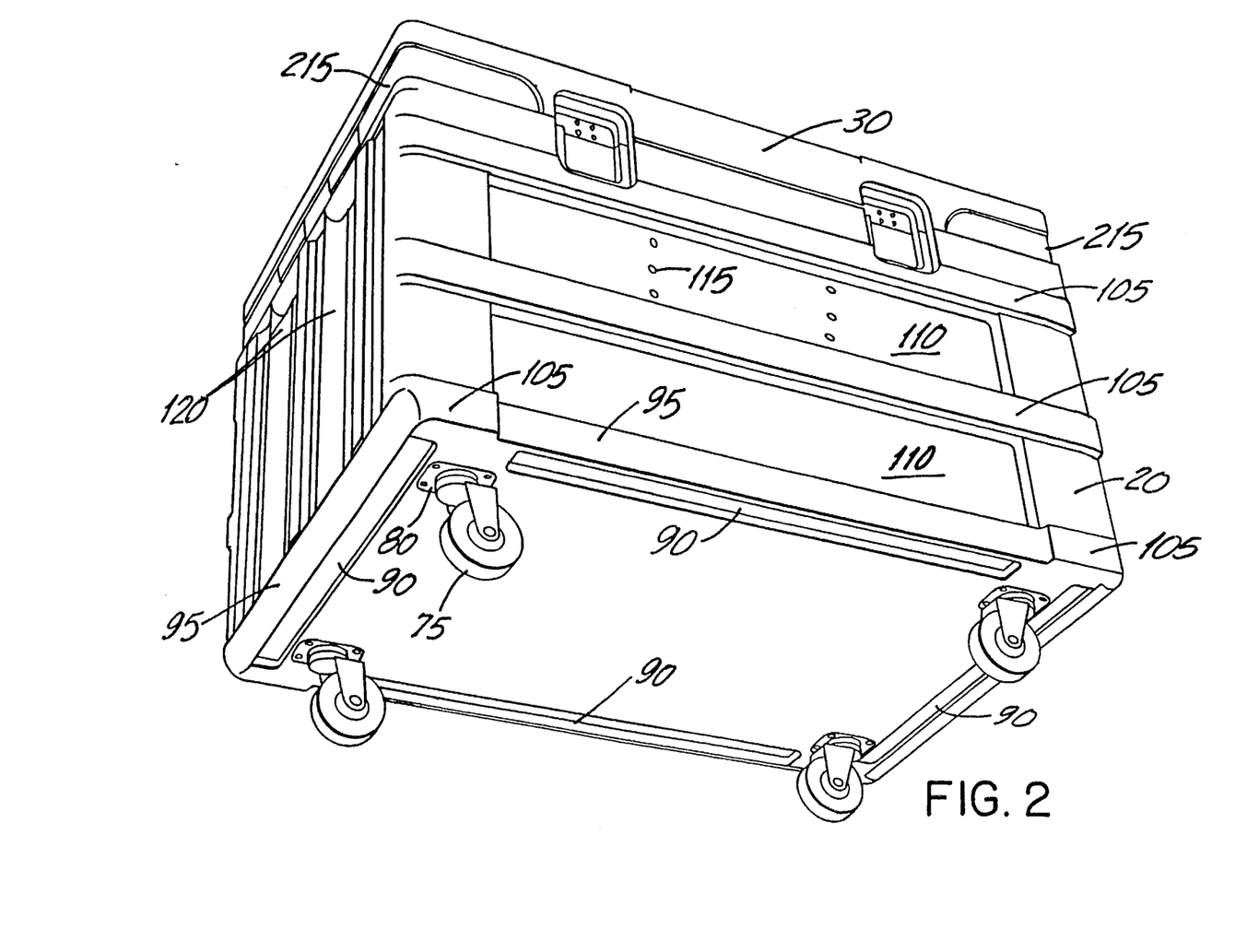
FIG. 2 is a bottom and left side perspective view of a storage trunk according to the present invention.

The storage trunk 10 of the present invention is shown in FIGS. 1 and 2. The trunk 10 is comprised of an enclosure body 20 and a separately removable lid 30. As will be discussed in greater detail below, the lid 30 may be fastened to the enclosure body 20 by means of a plurality of latches. The enclosure body 20 and lid 30 are preferably made of polyethylene, formed in accordance with the known rotationally molded plastic process, such as described in U.S. Pat. No. 3,134,140 to Knowles.

During the rotational molding process, separate molds (not shown) are utilized for fabrication of the enclosure body 20 and lid 30, wherein the inner surface of the mold forms the outer surface of the molded plastic 20, 30. The appropriate mold is filled with powdered plastic material, and is thereafter heated to a suitable temperature to melt the plastic powder. During the heating process the mold is rotated about a plurality of axes so that the melted plastic coats the interior walls of the entire mold. Once the melted plastic has coated the interior of the mold, the heat is removed while the rotation continues until the mold and plastic have cooled. Once cooled, the rotation can be stopped so that the mold may be disassembled and the finished molded plastic 20, 30 may be removed from the mold.

The rotationally molded plastic process inherently results in the plastic concentration being greater in the corners and edges of the storage trunk 10 than is found generally in the flat surfaces of the storage trunk, thereby adding additional strength in the areas subject to impact.

As will be discussed hereinafter, the plastic enclosure body 20 and lid 30 are molded with certain surface features and contours that provide utilitarian functions and contribute to the overall strength and durability of the storage trunk 10. The molded enclosure body 20 and lid 30 will be hollow, lightweight, durable and resistant to the impacts and abrasions normally experienced during transportation.

The enclosure body 20 is hollow and molded in a single piece to form a generally rectangular five-sided enclosure having an open top for receiving materials to be stored. The open top is adapted to be closed by means of the lid 30, discussed further below.

While it is preferred that the exterior characteristics of various embodiments of the enclosure body 20 remain identical, the interior volume of enclosure body 20 may be specifically molded for particular applications. The enclosure body 20 is molded with a double wall construction having an outer wall 50a and an inner wall 50b. The inner wall 50b may be molded to form a generally rectangular open volume, as in the embodiments shown in FIGS. 3A and 3B, or the inner wall 50b may be specifically molded to conform to the exterior characteristics of the devices to be stored, as in the embodiment shown in FIG. 3C.

Figure 3A:
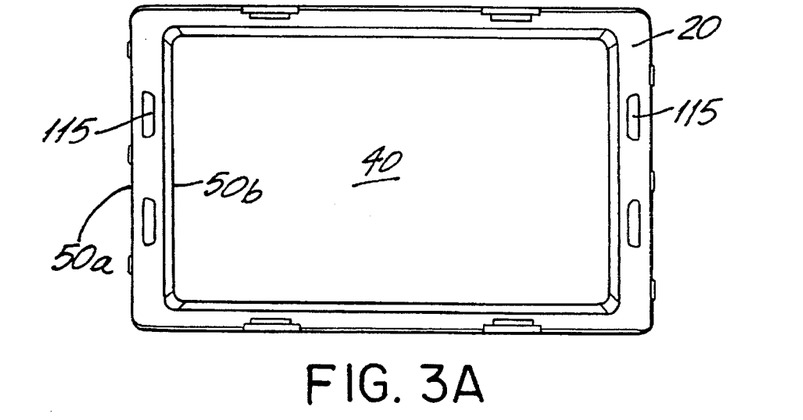
FIGS. 3A through 3C are top views of various embodiments of the interior volume of the enclosure body.
Figure 4A:
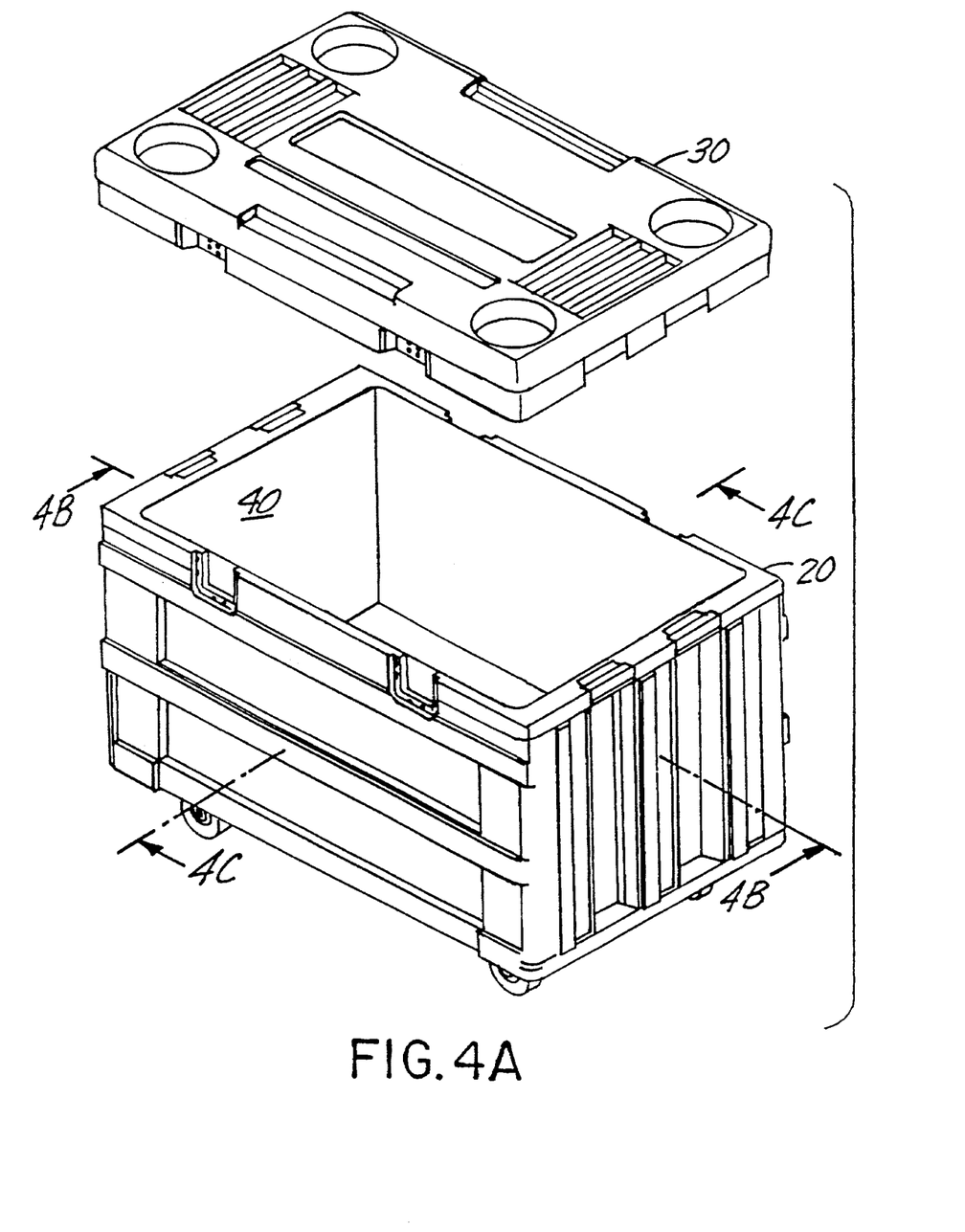
FIG. 4A is a top and right side perspective view of a removed lid and an enclosure body having a generally open rectangular interior volume.

In the generic "work trunk" embodiment, shown in FIG. 3A, the internal region 40 of the enclosure body 20 may be generally an open rectangular volume. The rectangular volume may be utilized for storing various lighting equipment, e.g., cable assemblies, repeater boxes and junction boxes. A perspective view of the "work trunk" embodiment of the enclosure body 20, with its lid 30 removed, is shown in FIG. 4A.

Figure 3B:
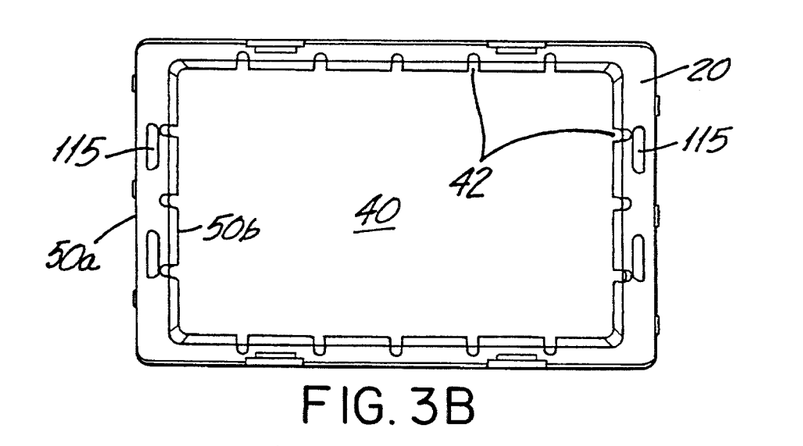

In the modified "compartmentalized work trunk" embodiment, shown in FIG. 3B, the interior region 40 of the enclosure body 20 may be generally an open rectangular volume, as in the genetic "work trunk" embodiment, however, the "compartmentalized work trunk" embodiment provides slots 42 in the interior walls 50b of the enclosure body 20 for sliding partitions (not shown) into the slots 42 for establishing multiple compartments. In this manner, rectangular sections may be allocated for storing lighting equipment, e.g., cable assemblies, repeater boxes and junction boxes. Alternatively, the interior region 40 of the enclosure body 20 may be provided with threaded inserts for securing the compartment dividers.

Figure 3C:
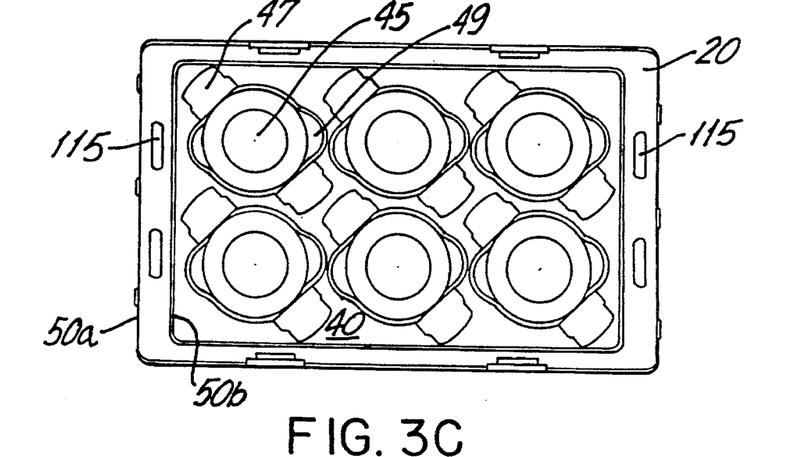
Figure 5A:
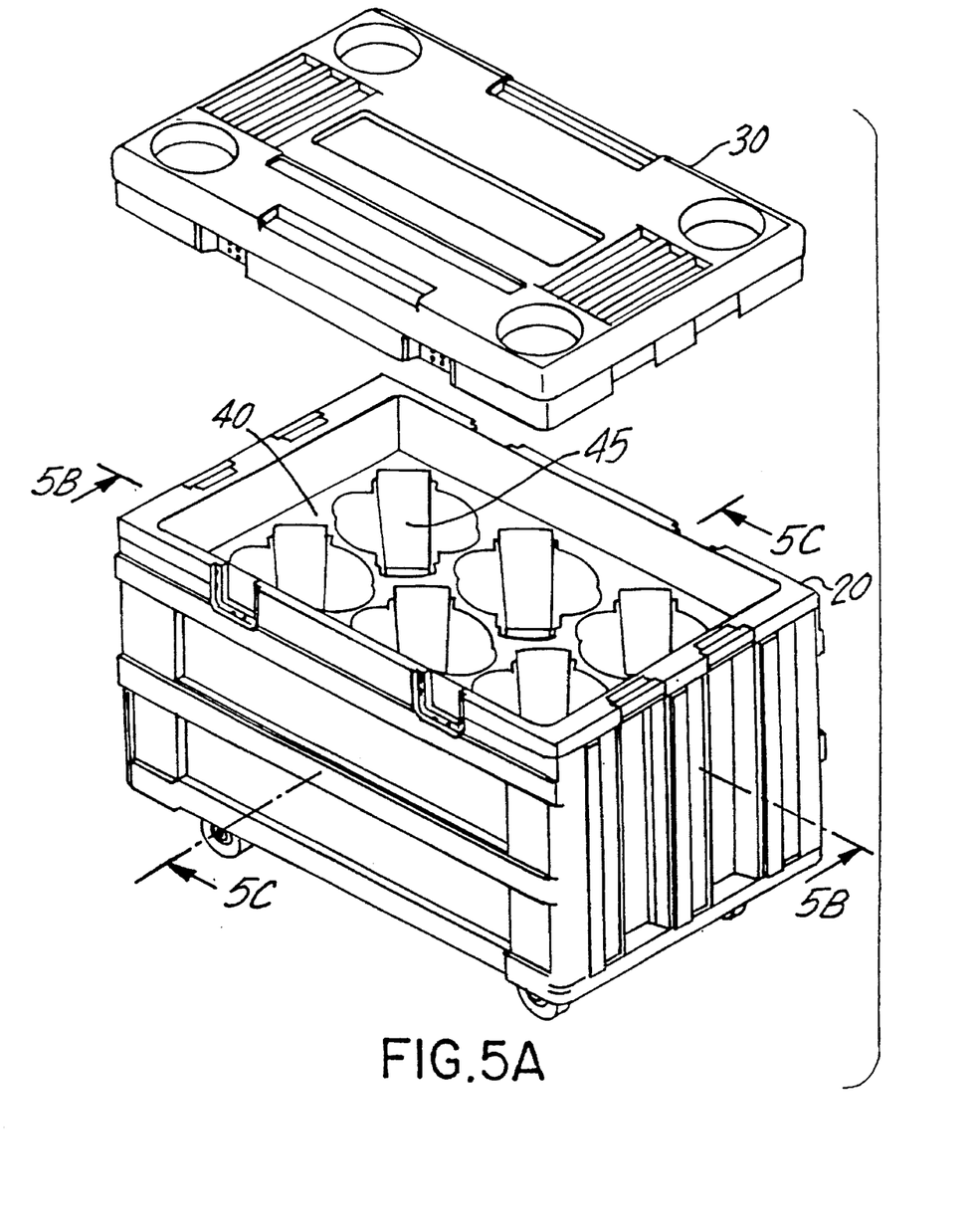
FIG. 5A is a top and right side perspective view of a removed lid and an enclosure body having a molded interior volume conforming to the exterior characteristics of the lighting devices to be stored.

In the "lamp storage trunk" embodiment, shown in FIG. 3C, the interior region 40 of the enclosure body 20 may be specially constructed with molded recesses 45 for receiving and securing specific equipment. For example, the storage trunk 10 may be designed for transporting lighting instruments, such as automated luminaires of the type manufactured by Vari-Lite, Inc. of Dallas, Tex. In order to be suitable for such a use, the storage trunk 10 preferably provides a plurality of lamp cavities especially formed during the molding process to fit and receive securely a plurality of lamp units of a particular size and shape. A perspective view of the "lamp storage trunk" embodiment of the enclosure body 20, with its lid 30 removed, is shown in FIG. 5A.

The "lamp storage trunk" embodiment, shown in FIG. 3C, is specifically designed for storing a luminaire such as the VL5™ luminaire, manufactured by Vari-Lite, Inc. of Dallas, Tex. As shown in FIG. 5D, the VL5™ luminaire 275 is mounted on a yoke 280 for achieving pan and tilt, and its exterior design is characterized by a "hump" 285 for housing electronic stepper motors. Accordingly, in addition to the central circular region of the molded recess 45, each molded recess 45 of the "lamp storage trunk" for the luminaire 275 contains two yoke cavities 47 for receiving and securing the yoke arms 290 of the luminaire 275 and two hump cavities 49 for receiving the hump portion 285 of the luminaire 275. Although the luminaire 275 only has a single hump 285, the utilization of two hump cavities 49 allows the luminaire 275 to be placed in the molded recess 45 in either of two orientations so as to save time and effort.

Figure 4B:
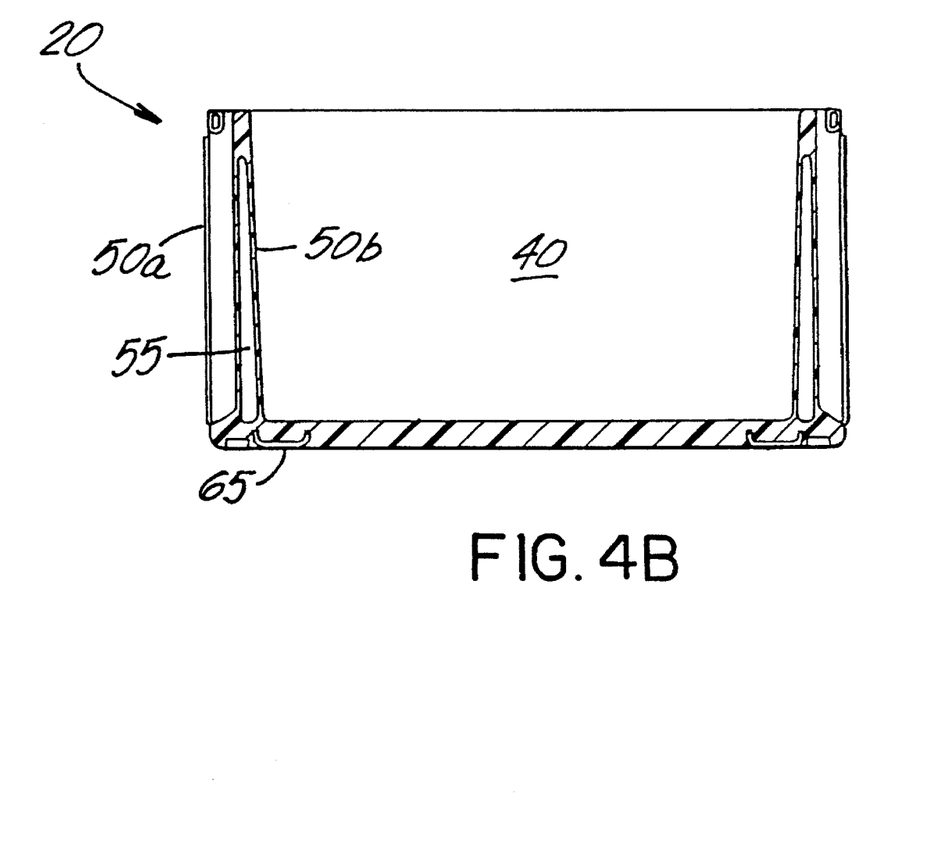
FIG. 4B is a cross-sectional view taken along the plane 4B in FIG. 4A.
Figure 4C:
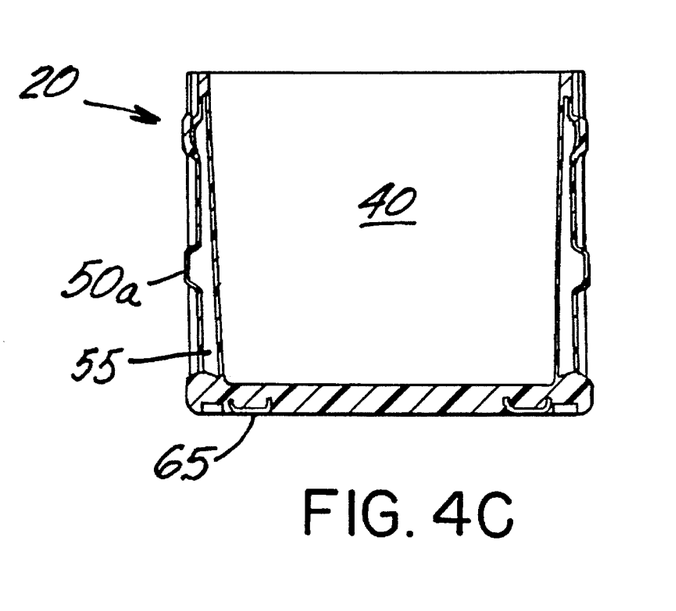
FIG. 4C is a cross-sectional view taken along the plane 4C in FIG. 4A.
Figure 5B:
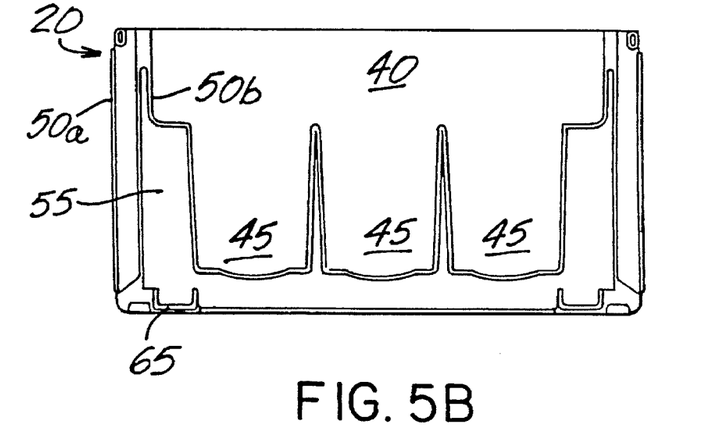
FIG. 5B is a cross-sectional view taken along the plane 5B in FIG. 5A.
Figure 5C:
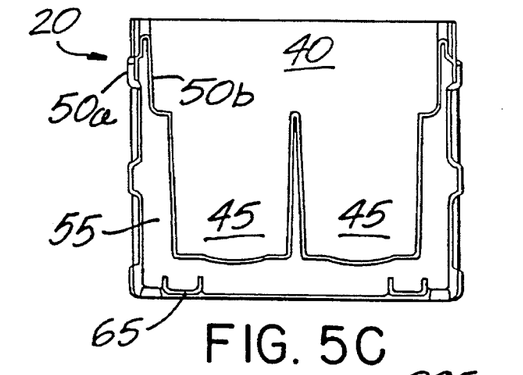
FIG. 5C is a cross-sectional view taken along the plane 5C in FIG. 5A.
Figure 5D:
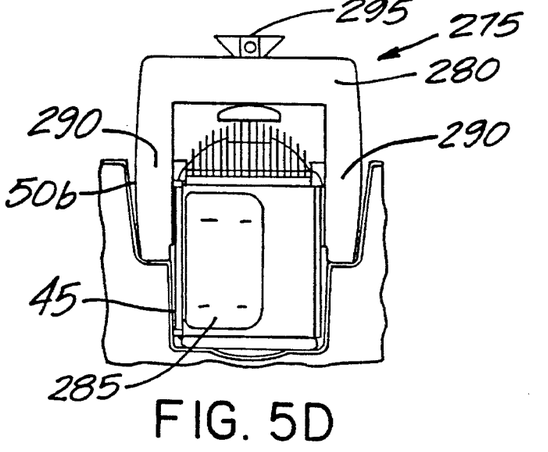
FIG. 5D is a cut-away view of a molded recess in the interior volume of the enclosure body of FIG. 5A illustrated with a stored lighting device.

The molded enclosure body 20 preferably has a hollow region 55 between the outer wall 50a and inner wall 50b of the enclosure body 20, shown in FIGS. 4B and 4C for the generic "work trunk" embodiment, and in FIGS. 5B and 5C for the "lamp storage trunk" embodiment. In a preferred embodiment, the hollow region 55 is filled with polyurethane foam to restrict stretching and sagging of the polyethylene walls 50a, 50b and to damp the movement of the walls. After the enclosure body 20 has been molded, the foam may be pumped through a temporary hole drilled in the wall 50b of the enclosure body. The foam filling adds strength to the otherwise hollow region 55. The foam reinforced walls 50a, 50b serve to absorb the shock and vibration that would otherwise be transmitted to the contents of the storage trunk 10.

In the "lamp storage trunk" embodiment, discussed above, two types of polyurethane foam, one of high density and a second foam having low density, are preferably utilized. The high density foam, being stronger and more rigid, is preferably utilized along the bottom of the hollow region 55 of the enclosure body 20 for reinforcement of the base of the enclosure body 20. The lower density foam, allowing for more spring, is preferably utilized in the upper regions adjacent to the molded lamp cavity recesses 45 to provide a shock absorbing cushion to the stored lamps 275 which are vibrated during transport.

Figure 6A:
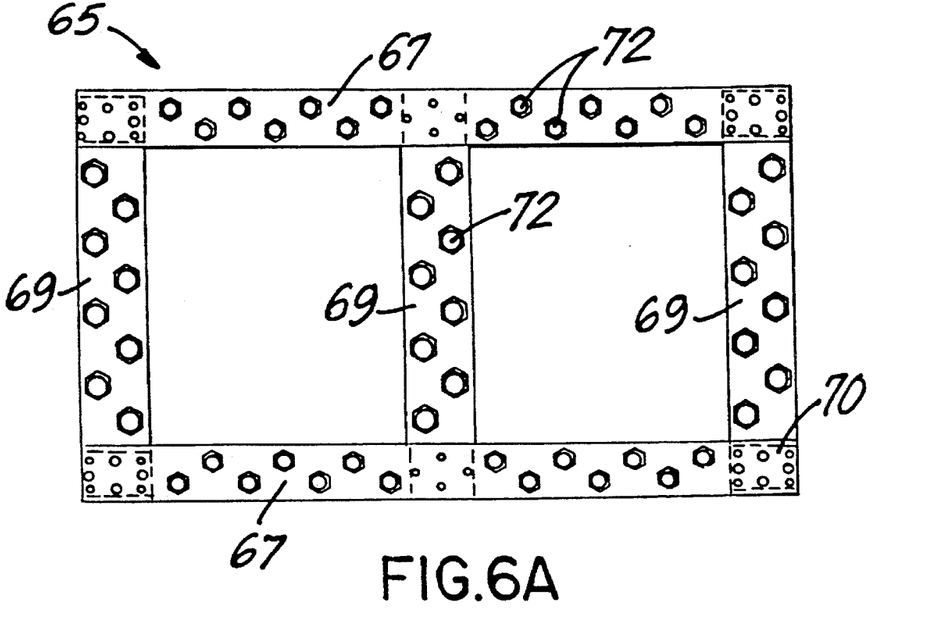
FIG. 6A is a top view of a perforated metal stiffening frame according to the present invention.

The enclosure body 20 is preferably constructed with a metal stiffening frame 65, shown in FIG. 6A, that is molded into the base of the enclosure body 20 during the molding process. In the preferred embodiment, the frame 65 is comprised of a pair of longitudinal perforated aluminum channels 67 that are welded to a series of transverse perforated aluminum channels 69 to form a "figure eight" shape, as shown in the figure. Prior to the molding process, the frame 65 is positioned in the bottom of the enclosure body mold. During the molding process, the melted plastic material will flow through the perforations 72 of the frame 65, thereby serving to secure the frame 65 in the molded plastic upon cooling. In one embodiment, the channels 67, 69 of the frame 65 are flanged, similar to a "U" shape, as seen in the cross-sectional views of FIGS. 4B and 5B, and the perforations 72 may be additionally provided on the upper portions of the channels 67, 69.

Figure 6B:
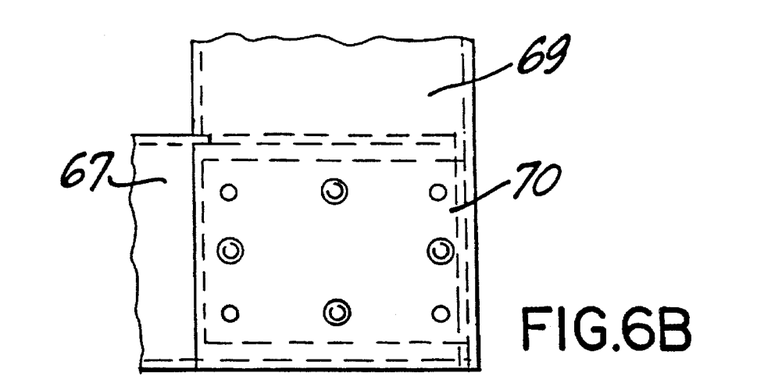
FIG. 6B is a sectional view of a corner of the perforated metal stiffening frame of FIG. 6A.

The frame 65 is preferably constructed with steel plates 70, shown in FIG. 6B, riveted to each of the four corners of the metal stiffening frame 65. Recesses can be molded into the corner regions of the underside of the plastic enclosure body 20 to expose the steel plates 70. Casters 75 can later be fastened to the exposed steel plates 70 in the corner recesses. The molded recess should be deep enough so that the bottom of the caster mounting flange 80 (FIG. 2) is flush with the underside of the enclosure body 20.

Alternatively, the reinforcing frame 65 may be constructed of only parallel rails molded into the base of the enclosure body 20 without any transverse rails. Additionally, steel plates molded into the corners of the base of the enclosure body 20, used in combination with the parallel rails or alone, may protrude through the underside of the enclosure body 20 for mounting casters 75.

The enclosure body 20 is preferably formed with various molded-in forms, recesses, and surfaces that serve to enhance the functionality, strength and durability of the plastic structure and to further resist the flexing of the polyethylene material. As shown in FIG. 2, hand grip recesses 90 are preferably molded along the edges of the underside of the enclosure body 20, and are complemented by thumb recesses 95 molded in the sides of the enclosure body 20 and by the thumb grip wells 100 (FIG. 1) provided in the end of the enclosure body 20 to accommodate the thumbs of handlers who may be lifting and/or stacking the storage trunk 10.

Lateral bearing surfaces 105 are molded to protrude from the enclosure body 20 along the sides of the enclosure body 20 to minimize the wear surface of the storage trunk 10 so that the entire side surface does not contact adjacent surfaces, e.g., other cases, walls, or floors. The side panel recesses 110 that are molded adjacent to the lateral bearing surfaces 105 provide additional strength, in addition to providing a suitable location for affixing graphics that identify, e.g., the equipment housed within the trunk 10. Threaded inserts 115 may be molded into the side panel recesses 110 of the enclosure body 20 for attaching paintable panels containing stenciled graphics. Paintable panels are preferred since paint will not easily adhere to the polyethylene material. Furthermore, due to the construction of the side panel recesses 110, the graphics panels that may be fastened in the side panel recesses 110 of the enclosure body 20 are protected from abrasive wear and tear.

Handles 115, shown in FIGS. 3A through 3C, are molded into the ends of each enclosure body 20 to permit lifting and pulling of the storage trunk 10. Hand wells 120 (FIGS. 1 and 2) are molded into the end of the enclosure body 20 below each handle 115 so that a handler can reach up from below the handle 115 to grasp the handle 115. A corresponding recess 125 is molded into the lid 30, discussed further below, to allow the handler's fingers to curl over the top of the handle 115 and to facilitate removal of the lid 30. When recess 125 in the lid 30 is provided with the proper profile and sufficient size, the handle 115 may be grasped from above.

Figure 7:
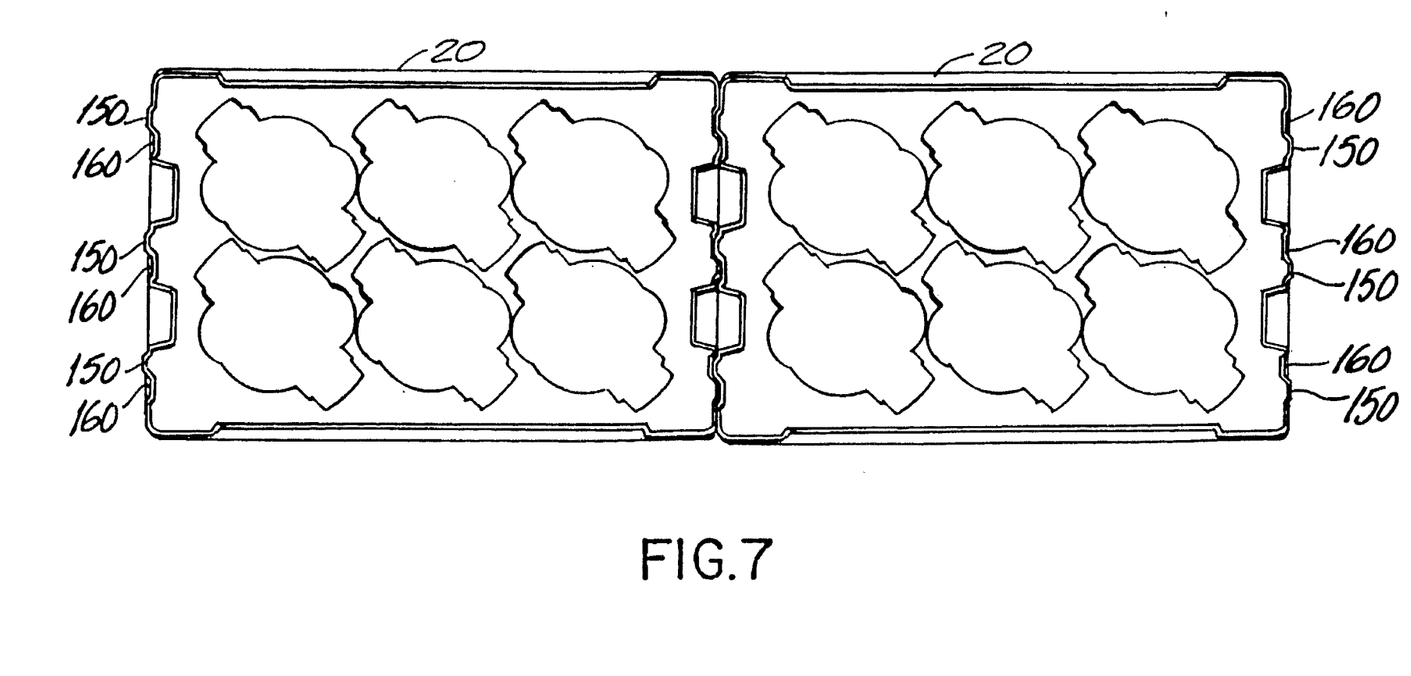
FIG. 7 is a top view of two enclosure bodies positioned end to end to illustrate the interlocking feature of the convoluted end surfaces.

The enclosure body 20 also includes convoluted end surfaces with protrusions 150 and recesses 160, as shown in FIG. 7, for providing bearing and wear surfaces when the storage trunks 10 are stacked end to end, as discussed further below. As shown in FIG. 7, when the enclosure bodies 20 are positioned end to end, the protrusions 150 of one enclosure body 20 fit into the recesses 160 of an adjacent enclosure body, so that the two enclosure bodies nest together in an interlocking fashion. The interlocking arrangement of the ends of the enclosure bodies prevents the trunks 10 from sliding around with respect to each other, due to the inherent slick characteristics of the polyethylene material. As shown in FIG. 7, the two ends of each enclosure body 20 are preferably symmetrical so that either end of one body will nest with either end of another body.

Drain holes (not shown) can be provided in the base of the enclosure body 20 for removal of water that may collect in the interior region 40 of the enclosure body 20. Since the trunks utilized for storing lighting equipment are often stored outside of a performance venue with their lids removed during a lighting performance, water that would otherwise tend to collect in the interior region 40 of the enclosure body 20 may be drained by means of the drain holes.

The lid 30 (FIG. 8A) is hollow and molded in a single piece for closing the enclosure body 20. The lid 30 must be suitably designed to form an airtight and waterproof seal with the interior surfaces 50b of the enclosure body 20 without requiring additional sealing materials. As shown in the side view of FIG. 8B, the lid 30 includes a plug 250 for mating with the open top of the enclosure body 20. As discussed above, recesses 125, shown in the end view of FIG. 8C, are molded into the lid 30 to allow the handler's fingers to curl around the handle 115 of the enclosure body 20 when the lid 30 is secured to the enclosure body 20.

Caster cups 205 (FIG. 8A) may be molded in the top of lid 30 to nest with the casters 75 of adjacent trunks 10 during stacking. The caster cups 205 prevent the stacked trunks from rolling. In a preferred embodiment, a reinforcing cone 210, shown in the cut-away view of the lid in FIG. 8D, is molded into the lid 30 beneath each caster cup 205 in a configuration known as a "kiss-off." The reinforcing cone 210 provides additional support for the caster cup 205 so that the casters 75 of an adjacent trunk 10 do not pierce the lid due to the sudden impact of one trunk 10 being stacked on top of another.

An additional recess 215 (FIG. 8B) may be molded into each end of the lid 30 to engage an adjacent trunk such that the recess 215 rests momentarily upon the rounded corner edge of the adjacent trunk while the trunks are being stacked on top of one another in order to lessen the load on the handlers while they get a better grip to complete the stacking process.

Figure 8A:
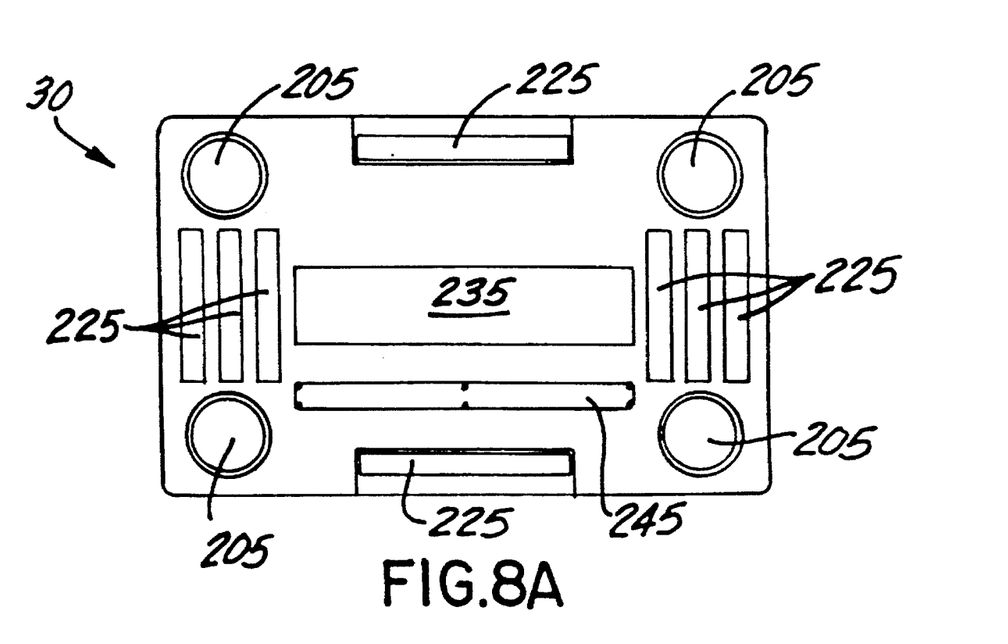
FIG. 8A is a top view of a lid according to the present invention.
Figure 8B:
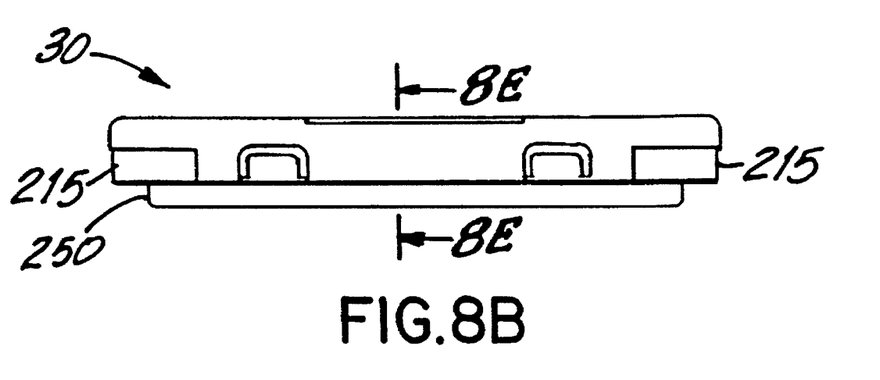
FIG. 8B is a side view of the lid of FIG. 8A.
Figure 8C:
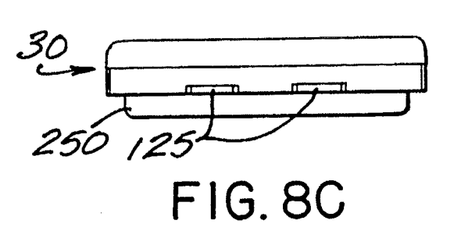
FIG. 8C is an end view of the lid of FIG. 8A.
Figure 8D:
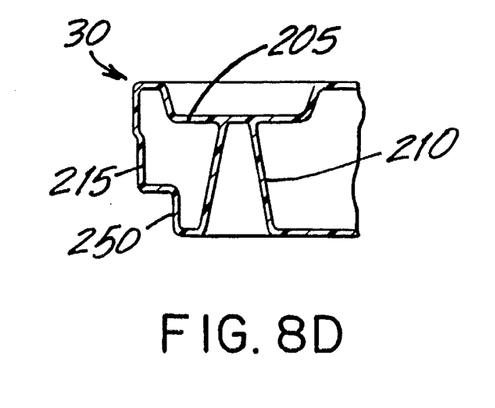
FIG. 8D is a cut-away cross-sectional view through the side of the corner region of the lid illustrating the caster cup with reinforcing cone.
Figure 8E:
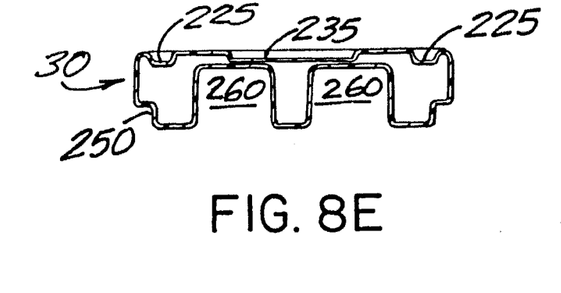
FIG. 8E is a cross-sectional view taken along the line 8E—8E in FIG. 8B.

For some applications, such as the "lamp storage trunk" embodiment, discussed above, it may be necessary to provide a clearance channel 260 in the lid 30, as shown in FIG. 8E. In this "lamp storage trunk" embodiment, the clearance channels 260 allow the tops 295 of the lamp units 275 (FIG. 5D) to extend above the molded recesses 45 of the enclosure body 20 into the regions of the clearance channel 260 in order to maximize the storage capacity.

Figure 8F:
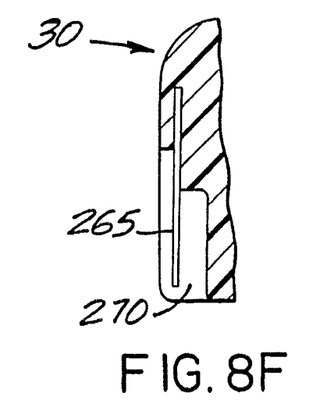
FIG. 8F is a cut-away cross-sectional view through the end view of the lid illustrating the latch mounting plate molded into the lid.
Figure 8G:
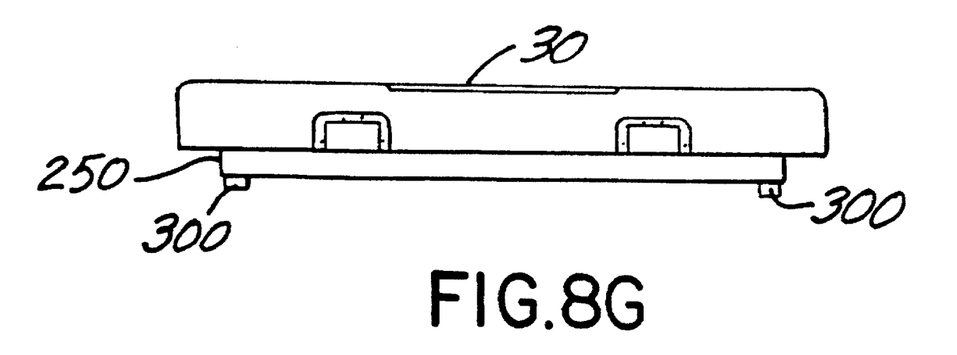
FIG. 8G is the side view of an alternate embodiment of a lid according to the present invention.
Figure 8H:
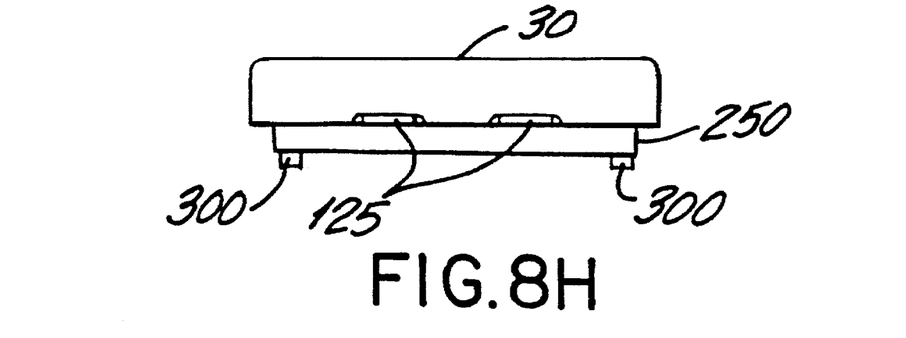
FIG. 8H is the end view of an alternate embodiment of a lid according to the present invention.

As shown in FIGS. 8G and 8H, the underside of lid 30 may be molded with protrusions 300 for nesting with the caster cups 205 of adjacent lids 30, thereby allowing the lids 30 to be stacked in an interlocking fashion.

As shown in FIGS. 1 and 8A, finger grips 225 are molded into the top surface of the lid 30 to enable handlers to easily grasp the trunk 10 for movement. In the illustrated embodiment, a plurality of finger grips 225 are provided at each end of the lid 30, and one additional finger grip 225 is provided along each side of the lid 30. A logo area 235 is provided in the center region of the top of the lid surface for including a logo which could be molded into the lid. The logo portion of the mold is preferably a separate piece so that different logos could be molded into different lids by changing only a single piece of the mold. Additionally, an identification graphics area 245 is recessed into the lid surface and preferably provided with threaded inserts captured in the plastic during the molding process. A paintable panel can thereafter be attached to the lid 30 in the identification graphics area 245 by means of screws mating with the threaded inserts. The paintable panel, such as a panel comprised of Masonite, can be stenciled with remarks identifying the equipment contained therein, e.g., the name of the tour which the lighting equipment supports.

A plurality of latches (not shown) may be utilized for securing the lid 30 to the enclosure body 20. In order to mount the top portion of a latch to the lid 30, a pair of perforated metal mounting plates 265 can be captured in each side of the molded plastic of the lid 30 during the molding process, as shown in FIG. 8F, which is a cross-sectional cut-away view of the lid 30 viewed from its end. Similarly, a second pair of perforated metal mounting plates 265 can be captured in each side of the enclosure body 20 during the molding process for mounting the bottom half of the latch mechanisms necessary for mating with the latches of the lid 30.

The metal mounting plates 265 can be captured in the molded plastic by suspending each mounting plate 265 in its proper position during the molding process by a suitable fixture so that the melted plastic material flows through the perforations of the mounting plate 265, thereby capturing the mounting plate 265 in the molded plastic 20, 30 upon cooling.

Each mounting plate 265 for the lid 30 can be exposed through a recessed portion 270 (FIG. 8F) of the molded plastic of the lid 30 to provide a suitably rigid structure upon which the top half of a latch may be mounted and secured by rivets. Similarly, the mounting plates for the enclosure body 20 can be exposed through recessed portions of the molded plastic of the body 20 to provide a suitably rigid structure upon which the bottom half of a latch may be mounted and secured by rivets. The latch can be embodied as a split dish latch mechanism, such as Part No. 1889, manufactured by J. H. Session & Son, Inc. of Bristol, Conn.

Since each latch is mounted to a mounting plate 265 that extends from a recess of the molded plastic, there is no need to bore holes through the inner wall 50*b* of the enclosure body 20 for mounting. Thus, the interior walls 50*b* of the enclosure body 20 and the lid 30 are fabricated without any punctures or holes. In this manner, the present invention provides a seamless design for the interior volume, thereby improving the waterproof characteristics.

Alternatively, the latches may be riveted directly into the outer wall 50*a* of the enclosure body 20 and the lid 30 without penetrating the inner wall 50*b* of the enclosure body or the lid. In this manner, the seamless surfaces of the interior volume of the design are maintained.

The color of each case is imparted to the polyethylene material during the molding process, as is known in the art. The color thus becomes integral to the plastic material and will not wear off. Accordingly, the storage trunk 10 of the present invention will not need resurfacing, repainting or recarpeting.

The storage trunks 10 of the present invention may be conveniently loaded onto a truck for transportation. The design of the present invention allows the storage trunks 10 to be easily rolled on their casters 75 onto a truck. Thereafter, the cases can be stood on their ends with their lids 30 facing the front of the truck and their casters 75 facing the rear of the truck. The trunks 10 may be lined up side-by-side in a row utilizing the width of the truck. The height of the trunks 10 is preferably suitable for accommodating a second level of trunks stacked across the top of the first row. As discussed above, relative to FIG. 7, the protrusions 150 and recesses 160 of the enclosure body 20 establish an interlocking arrangement that prevents the stacked trunks 10 from sliding around with respect to each other.

Figure 9:
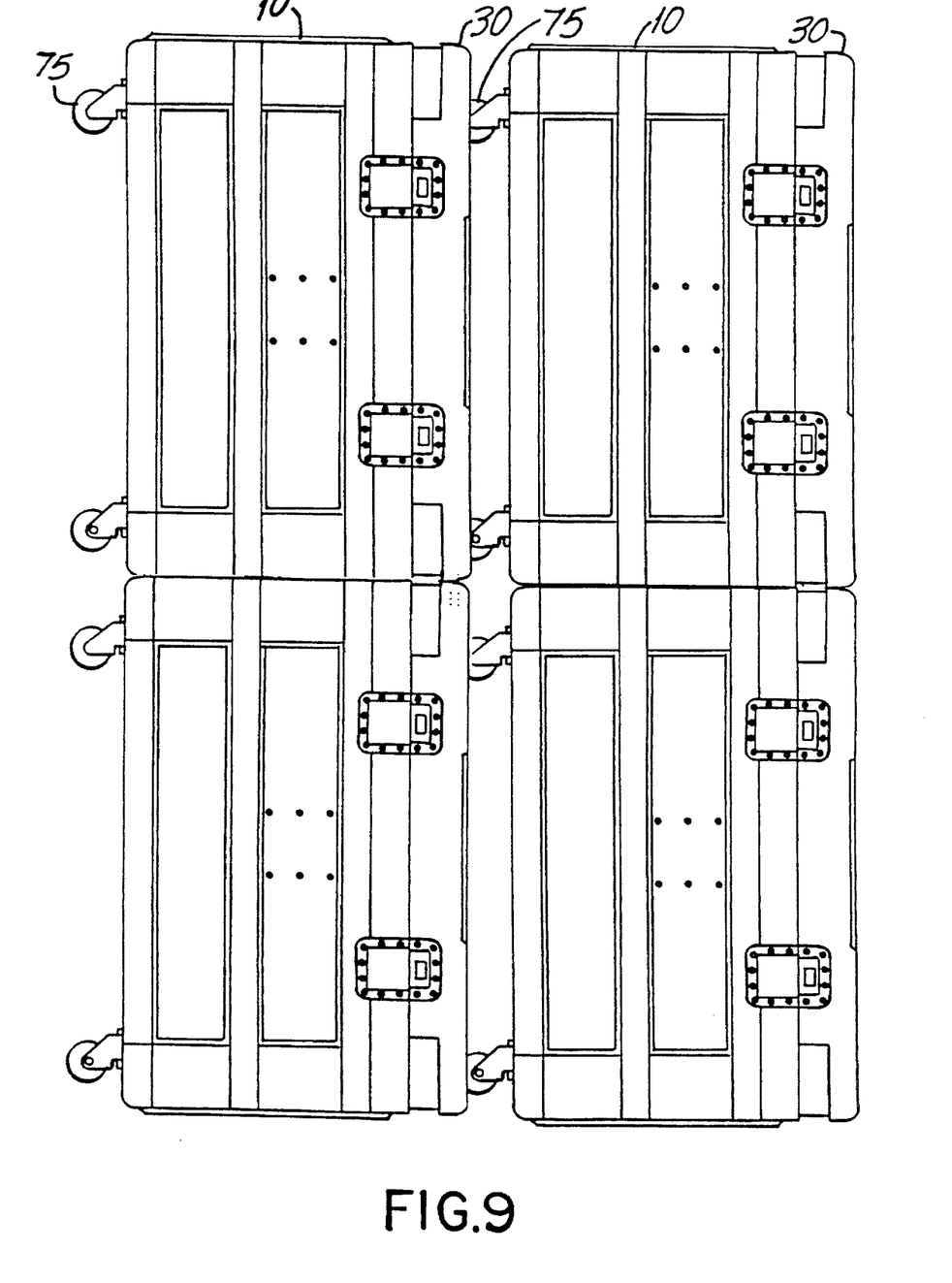
FIG. 9 is a view of a plurality of storage trunks according to the present invention stacked and arranged for transport.

Thereafter, as illustrated in FIG. 9, additional rows of trunks 10 may be stacked across the width of the truck behind the preceding rows with the lids 30 of each row adjacent to the casters 75 of the previous row. In this manner, the recessed caster cups 205 will mate with the casters 75 of adjacent trunks saving truck space.

In the preferred embodiment, the storage trunk 10 is approximately 30 inches wide, 48 inches long, and 34 inches tall (including the height of the lid 30). Additionally, the depth of the caster cups 205 is 1½ inches deep. Since the useful cargo area of a truck typically has a width of 92 ¾ inches, an overall length of 45 feet, and an overall height of 116 inches tall (with the 12 foot long "dance floor" in front being only about 106 inches tall). Accordingly, 90 storage trunks may be easily transported.

We claim:

1. A trunk for containing lighting equipment, said trunk comprising:

a plastic enclosure body having an interior volume for containing said lighting equipment, said body formed by a base molded to a plurality of walls, wherein each of said walls is comprised of an inner wall and an outer wall with a hollow region therebetween;

a removable plastic lid;

a reinforcing frame molded into said base;

means for waterproofing said trunk;

integral cushioning means in said hollow region for reducing the shocks transmitted to said contained lighting equipment;

casters mounted to said reinforcing frame:

handles formed in said enclosure body:

hand grips formed in said plastic lid:

recesses formed in said lid for receiving the casters of a second trunk of complementary construction: and protrusions and recesses formed in opposing walls of said enclosure body for mating with an adjacent trunk of complementary construction.

2. The trunk according to claim 1, wherein said reinforcing frame includes perforations, wherein said perforations allow melted plastic to flow through said frame.

3. The trunk according to claim 1, wherein said cushioning means comprises polyurethane foam.

4. The trunk according to claim 1, wherein said interior volume is molded to form a generally rectangular open volume.

5. The trunk according to claim 4, wherein said rectangular volume further includes slots in said walls for establishing compartments.

6. The trunk according to claim 1, wherein said interior volume is molded to conform to the exterior characteristics of the lighting devices to be stored.

7. The trunk according to claim 1, wherein said plastic enclosure body is formed by a rotationally molded plastic process.

8. The trunk according to claim 1, wherein said plastic lid is formed by a rotationally molded plastic process.

9. The trunk according to claim 1, wherein said recesses for receiving casters are reinforced with supports integral with said lid.

10. The trunk according to claim 1, wherein said reinforcing frame further includes a steel plate at each corner, wherein each of said steel plates have a mounting surface extending through the underside of said enclosure body for mounting casters.

11. The trunk according to claim 1, wherein said lid further includes a clearance channel for receiving the upper portions of said contained lighting equipment.

12. The trunk according to claim 1, further comprising a fastener for securing said enclosure body to said lid.

13. The trunk according to claim 12, further comprising a mounting plate molded into said enclosure body and said lid, said mounting plate having a mounting surface extending from said enclosure body and said lid for mounting said fastener.

14. The trunk according to claim 13, wherein said mounting plate includes perforations, wherein said perforations allow melted plastic to flow through said plate.

15. The lighting equipment trunk of claim 1 characterized in that said trunk when loaded is readily moveable by a single individual.

16. The lighting equipment trunk of claim 12 characterized in that said trunk when loaded is readily moveable by a single individual.

17. The lighting equipment trunk of claim 13 characterized in that said trunk when loaded is readily moveable by a single individual.

* * * * *